UNITED STATES PATENT OFFICE

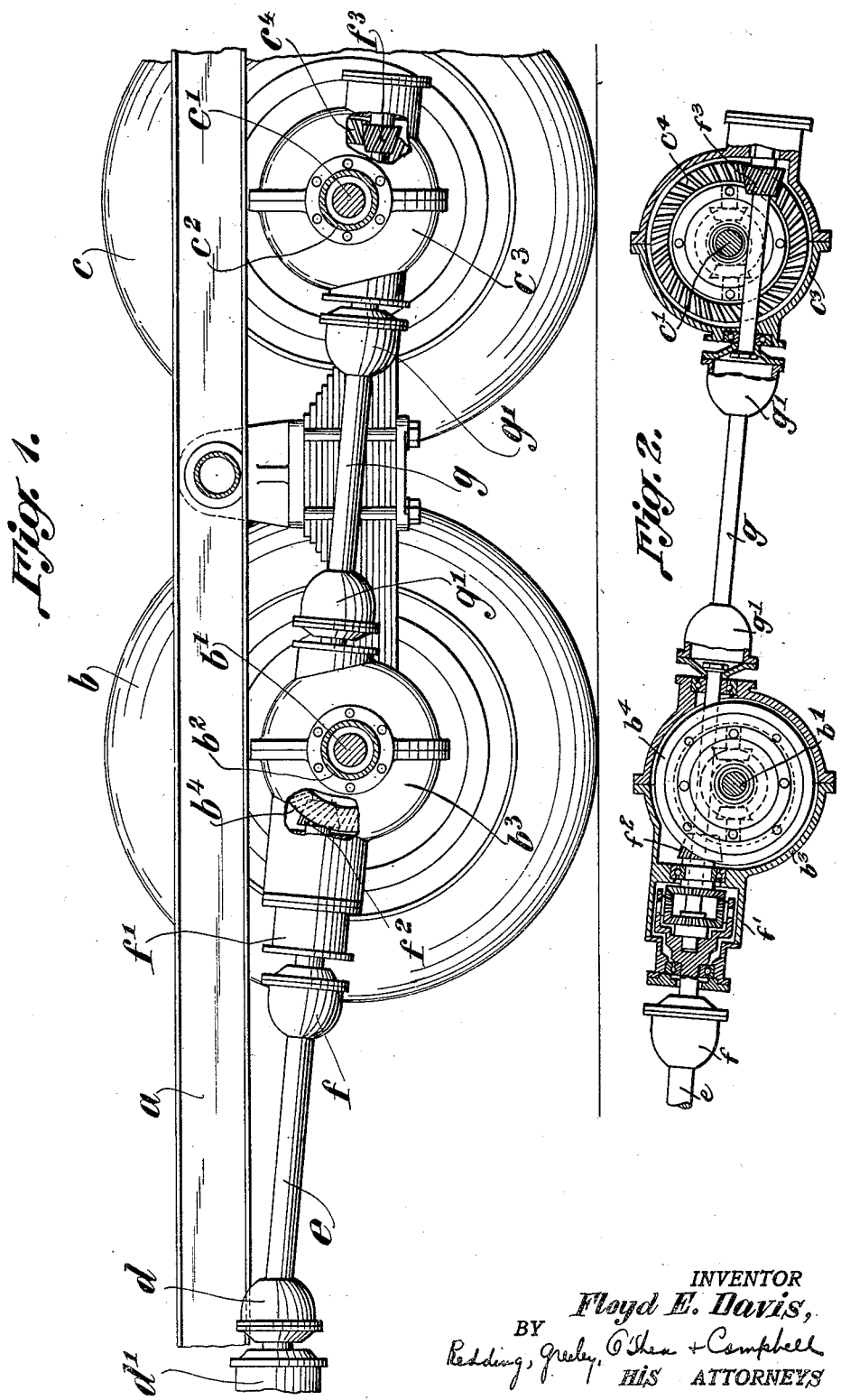

FLOYD E. DAVIS, OF ALLENTOWN, PENNSYLVANIA, ASSIGNOR TO INTERNATIONAL MOTOR COMPANY, OF NEW YORK, N. Y., A CORPORATION OF DELAWARE

DRIVING MECHANISM FOR MOTOR VEHICLES

Application filed May 26, 1930. Serial No. 455,631.

The present invention relates to drives for motor vehicles and embodies, more specifically, an improved driving mechanism by means of which excessive angles in the universal joints are eliminated and the driving mechanism brought substantially in line under normal operating conditions.

The disadvantage of transmitting power through a series of shafts disposed at angles to each other will be readily apparent since the efficiency of universal joints decreases materially with increasing angles between driving and driven members which are connected by means of such joints. The common condition existing in motor vehicle design necessitates universal joints between the ends of the propeller shaft and the related driving elements of the vehicle, the longer the propeller shaft the less the driving angle of the universal joint. Where the drive is transmitted to rear axles, there is not only required the angularity at each end of the propeller shaft but an additonal set of universal joints is required to transmit the power to the rearward of the driving axles. With the usual form of drives, the existence of these driving angles is inevitable and the present invention seeks to provide an improved form of drive by means of which such driving angles may be substantially eliminated. The invention contemplates therefor the provision of a driving mechanism for motor vehicles by means of which the driving angles existing between the various driving elements are substantially decreased.

A further object of the invention is to provide a drive of the above character by means of which the propeller shaft is normally substantially in line with the final drive mechanism of the rear driving unit of a motor vehicle and, where four rear driven wheels are utilized, is also substantially in line with the shaft section transmitting the drive to the final driving mechanism of the rear driving unit.

Further objects, not specifically enumerated above, will be apparent as the invention is described in further detail in connection wth the accompanying drawings, wherein:

Figure 1 is a view in longitudinal section taken through a portion of a motor vehicle chassis constructed in accordance with the present invention, portions thereof being broken away in the interest of clearness.

Figure 2 is a view in longitudinal section, taken through the driving mechanism of Figure 1.

Referring more specifically to the accompanying drawings, a vehicle frame is shown at $a$ having two rear driving wheels at each side thereof, these wheels being indicated by the reference characters $b$ and $c$. Jack shafts $b'$ and $c'$ are provided for driving the respective wheels $b$ and $c$ and may be carried within housings $b^2$ and $c^2$, respectively. Differential mechanism may be provided in the respective pots $b^3$ and $c^3$ and each is provided with a hyperbolical spiral ring gear $b^4$ and $c^4$, respectively.

Power is derived from a suitable source, being transmitted to a universal joint $d$ through a suitable housing $d'$. A propeller shaft $e$ is shown connected to the universal joint and transmitting power to a second universal joint $f$. This last named universal joint supplies power to a differential mechanism $f'$ which apportions such power between the axles $b'$ and $c'$. A hyperbolical spiral driving pinion $f^2$ supplies a portion of the power to the ring gear $b^4$ while a second such pinion $f^3$ supplies the remaining power to the ring gear $c^4$.

Connected between the differential housings $b^3$ and $c^3$, a shaft section $g$ is provided, the ends of this shaft section being connected through universal joints $g'$. In order that the shaft section $g$ may be aligned with the propeller shaft $e$, the axis of the forward driving pinion is so designed to fall above the axis of the shaft $b'$ while the drive is below the axis of the shaft $c'$. In this manner, the axes of the pinions $f^2$ and $f^3$ are aligned and in alignment with the shafts $e$ and $g$. To effect the proper reversal of movement, the pinion $f^3$ drives from the rear side of the ring gear $c^4$, as clearly shown in the drawing, while the forward pinion $f^2$ drives from the forward side of the ring gear $b^4$.

From the foregoing, it will be apparent that, under normal conditions, the angle between the shafts e and g is practically zero. Only under extreme conditions, is this condition disturbed and then only for a relatively short period of time. The beneficial results derived from the foregoing will be obvious and while the invention has been described with specific reference to the accompanying drawings, it is not to be limited, save as defined in the appended claims.

I claim as my invention:

1. A vehicle having a plurality of parallel driving axles, a propeller shaft lying in a plane above the forward axle, spiral hyperbolical gears between the propeller shaft and the forward axle, a shaft section aligned with the propeller shaft and passing under the axis of the rearward axle for driving the last named axle, and spiral hyperbolical gears between the shaft section and the last named axis.

2. A vehicle having a plurality of parallel driving axles, a propeller shaft, means to drive one of the axles from the shaft and passing above the axis of the axle, a shaft section aligned with the propeller shaft and passing below the axis of another of the axles for driving the last named axle, and spiral hyperbolical gears between the shafts and respective axles to transmit power thereto.

3. A vehicle having a plurality of parallel driving axles, a propeller shaft, means to drive one of the axles from the shaft and passing above the axis of the axle, and means aligned with and driven by the propeller shaft and passing below the axis of another of the axles for driving the last named axle.

4. A vehicle having a plurality of parallel driving axles, a propeller shaft passing above the axis of the forward axle and below the axis of the rearward axle, means between the propeller shaft and forward axle and disposed forwardly of the axis of the forward axle to drive the latter, and means between the propeller shaft and rearward axle and rearward of the axis of the latter for driving the said rearward axle.

5. A vehicle having a plurality of parallel driving axles, differential mechanisms associated with each axle, a power apportioning means for apportioning power between the differentials, a propeller shaft driving the apportioning means, a shaft section above and forward of the driving axles and driven by the apportioning means for driving the forward axle, a shaft section between the axles, passing under the rear axle and aligned with the propeller shaft and driven by the apportioning means, and means between the last named shaft section and the rear axle and rearwardly of the said axle for driving the rear differential.

6. A vehicle having a plurality of parallel driving axles, differential mechanisms associated with each axle, a power apportioning means for apportioning power between the differentials, a propeller shaft driving the apportioning means, a shaft section forward of the driving axles and driven by the apportioning means for driving the forward axle, the axis of the shaft section lying in the plane of the propeller shaft and passing above the forward axle, a shaft section between the axles and aligned with the propeller shaft and driven by the apportioning means, and means between the last namd shaft section and the rear axle and rearwardly of the said axle for driving the rear differential, said means being aligned with the propeller shaft and passing below the rearward axle.

This specification signed this 16th day of May A. D. 1930.

FLOYD E. DAVIS.